United States Patent
Steiner et al.

(10) Patent No.: US 6,798,859 B1
(45) Date of Patent: Sep. 28, 2004

(54) BRANCH AMPLIFIER CARD

(75) Inventors: William Michael Steiner, San Jose, CA (US); Craig Miles Smith, San Jose, CA (US); Leonid Boris Sheikman, San Jose, CA (US); Craig Ernest Leighty, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/642,715

(22) Filed: Aug. 18, 2003

(51) Int. Cl.[7] .................................................. G21C 7/36
(52) U.S. Cl. .................. 376/217; 376/216; 376/230; 376/259; 137/814; 137/815; 137/819; 318/560; 318/604; 318/681
(58) Field of Search ................................ 376/216, 217, 376/234, 259; 137/814, 815, 819; 318/560, 604, 681

(56) References Cited

U.S. PATENT DOCUMENTS

| | | | | |
|---|---|---|---|---|
| 3,706,921 A | * | 12/1972 | Rosen | 318/564 |
| 3,793,141 A | | 2/1974 | Ball | 176/36 R |
| 3,796,890 A | * | 3/1974 | Thompson et al. | 376/230 |
| 4,263,580 A | | 4/1981 | Sato et al. | 340/163 |
| 4,282,061 A | | 8/1981 | Sakurai et al. | 176/20 R |
| 4,434,132 A | * | 2/1984 | Cook | 376/259 |
| 4,640,812 A | | 2/1987 | Sawyer et al. | 376/245 |
| 4,690,794 A | | 9/1987 | Onodera | 376/230 |
| 4,843,537 A | * | 6/1989 | Arita et al. | 700/82 |
| 5,128,093 A | | 7/1992 | Ose | 376/219 |
| 5,581,586 A | * | 12/1996 | Sunami et al. | 376/228 |
| 5,586,156 A | | 12/1996 | Gaubatz | 376/216 |
| 5,984,504 A | * | 11/1999 | Doyle et al. | 700/108 |
| 6,590,952 B2 | * | 7/2003 | Ishii et al. | 376/259 |
| 6,650,722 B1 | * | 11/2003 | Steiner et al. | 376/217 |
| 2002/0122520 A1 | | 9/2002 | Ishii et al. | |

* cited by examiner

*Primary Examiner*—Jack Keith
*Assistant Examiner*—John Richardson
(74) *Attorney, Agent, or Firm*—Armstrong Teasdale LLP (57) ABSTRACT

A branch amplifier card for a nuclear reactor control rod drive control system is provided. The control system includes a control processor, a plurality of transponder cards arranged in clusters with each cluster under the control of a branch amplifier card. The branch amplifier card is configured to receive commands from the control processor, send the converted commands to transponder cards under the control of the branch amplifier card and to a downstream branch amplifier card, receive an acknowledge word from transponder cards under the control of the branch amplifier card, add AC voltage threshold level information about the transponder cards under the control of the branch amplifier card to the acknowledge word, permit transponder trouble information attached to the acknowledge word to remain in the acknowledge word, and resend the acknowledge word including the transponder trouble information to an upstream branch amplifier card.

18 Claims, 5 Drawing Sheets

BRANCH AMPLIFIER CARD

BACKGROUND OF THE INVENTION

This invention relates generally to nuclear reactors, and more particularly to control rod drive system branch amplifier cards.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

The reactor core is formed from a plurality of fuel elements. The fuel elements are grouped together at fixed distances from each other in a fuel bundle. A sufficient number of these fuel bundles are combined to form a reactor core capable of a self-sustaining chain reaction. Neutron-absorbing control rods are inserted into the core to control the reactivity of the core. The reactivity of the core can be adjusted by incremental insertions and withdrawals of the control rod.

Each control rod is housed within a vertical guide tube that ensures the vertical orientation and motion of the control rod. The control rod is moved using a control rod drive mechanism that is at least partially housed in a stub tube that also serves to support the base of the guide tube. A rod drive control system controls a hydraulic control unit (HCU) that causes the control rod drive mechanism to move the control rod, either inserting or withdrawing the rod from the fuel bundle. The HCU includes transponder cards that control the solenoids in the HCU.

Because the control rods are the primary means for regulating reactor output, it is essential that the control rod drives remain fully functional. The control rod drive system is designed to shut down and prevent movement of all control rods whenever one of the circuit boards that control the insertion or withdrawal of the control rods is determined to be defective. This requires immediate attention of plant personnel to replace the defective electronics so that the HCU can become fully operational. No control rod movement is possible until the defective circuitry is replaced.

BRIEF DESCRIPTION OF THE INVENTION

In one aspect, a branch amplifier card for a nuclear reactor control rod drive control system is provided. The control system includes a control processor, a plurality of transponder cards arranged in clusters with each cluster under the control of a branch amplifier card. The branch amplifier card is configured to receive commands from the control processor, send the converted commands to transponder cards under the control of the branch amplifier card and to a downstream branch amplifier card, receive an acknowledge word from transponder cards under the control of the branch amplifier card, add AC voltage threshold level information about the transponder cards under the control of the branch amplifier card to the acknowledge word, permit transponder trouble information attached to the acknowledge word to remain in the acknowledge word, and resend the acknowledge word including the transponder trouble information to an upstream branch amplifier card.

In another aspect, a nuclear reactor control rod drive control system is provided. The nuclear reactor includes a plurality of control rods. The control system includes a control processor, a plurality of control rod drives with each control rod drive configured to connect to a control rod, and an hydraulic control unit connected to each control rod drive with the hydraulic control unit including a transponder card, and a plurality of branch amplifier cards operationally connected to the control processor and to each other. Each branch amplifier is operationally connected to and controlling a cluster of transponder cards. The branch amplifier card is configured to receive commands from the control processor, send the converted commands to transponder cards under the control of the branch amplifier card and to a downstream branch amplifier card, receive an acknowledge word from transponder cards under the control of the branch amplifier card, add AC voltage threshold level information about the transponder cards under the control of the branch amplifier card to the acknowledge word, permit transponder trouble information attached to the acknowledge word to remain in the acknowledge word, and resend the acknowledge word including the transponder trouble information to an upstream branch amplifier card.

In another aspect, a nuclear reactor is provided that includes a reactor pressure vessel, a reactor core located inside the reactor pressure vessel, and control rod drive control system. The core includes a plurality of fuel assemblies and a plurality of control rods. The control rod drive system includes a control processor, a plurality of control rod drives with each control rod drive connected to a control rod, an hydraulic control unit connected to each said control rod drive, and a plurality of branch amplifier cards operationally connected to the control processor and to each other. The hydraulic control unit includes a transponder card. Each branch amplifier is operationally connected to and controlling a cluster of transponder cards. The branch amplifier card is configured to receive commands from the control processor, send the converted commands to transponder cards under the control of the branch amplifier card and to a downstream branch amplifier card, receive an acknowledge word from transponder cards under the control of the branch amplifier card, add AC voltage threshold level information about the transponder cards under the control of the branch amplifier card to the acknowledge word, permit transponder trouble information attached to the acknowledge word to remain in the acknowledge word, and resend the acknowledge word including the transponder trouble information to an upstream branch amplifier card.

DETAILED DESCRIPTION OF THE INVENTION

A branch amplifier card for a nuclear reactor control rod drive control system is described below in more detail. The branch amplifier card interfaces with transponder cards and permits continued system operation in the event of a failure of transponder card circuitry that controls the movement of the control rods. The transponder card is configured to detect failures of its rod control circuitry and prevent inadvertent incremental rod insertion without depending on the Rod Control system to remove power from the transponder card. Further, the branch amplifier card functions as a router of serial instructions (words) to and from the rod drive cabinet and transponder cards and other branch amplifier cards in an asynchronous multiplexing system and permits the transponder card to announce to the Rod Control system via a bit on a serial data word that the transponder card has detected a defect in itself.

Figure 1:
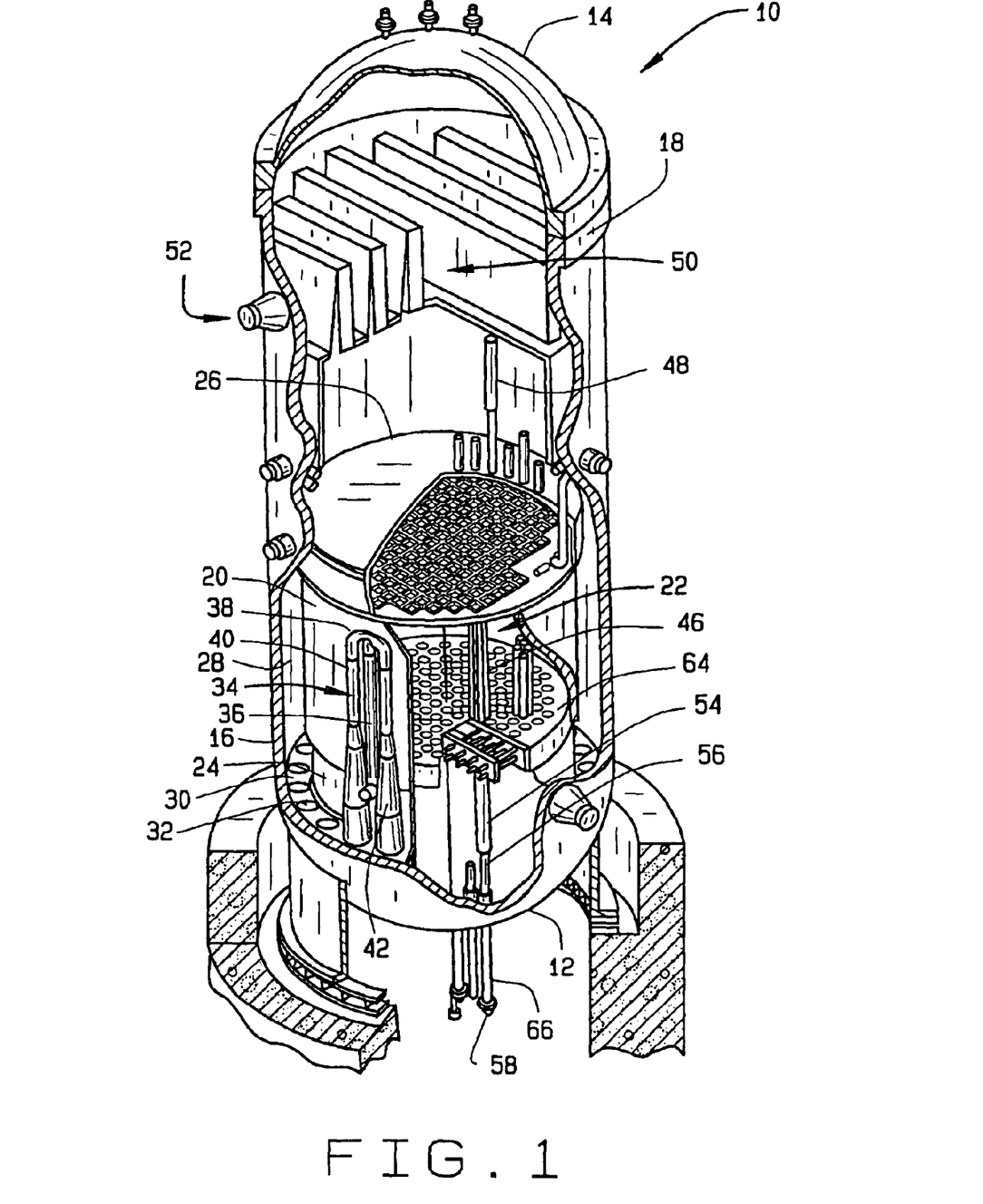
FIG. 1 is a sectional schematic view, with parts cut away, of a boiling water nuclear reactor pressure vessel.

Referring to the drawings, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes an opposed removable shroud head 26. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42.

Heat is generated within core 22, which includes fuel bundles 46 of fissionable material. Water circulated up through core 22 is at least partially converted to steam. Steam separators 48 separates steam from water, which is recirculated. Steam dryers 50 remove residual water from the steam. The steam exits RPV 10 through a steam outlet 52 near vessel top head 14.

The amount of heat generated in core 22 is regulated by inserting and withdrawing a plurality of control rods 54 of neutron absorbing material, for example, hafnium. To the extent that control rod 54 is inserted into fuel bundle 46, it absorbs neutrons that would otherwise be available to promote the chain reaction which generates heat in core 22.

Control rod 54 couples with a control rod drive (CRD) 58 which moves control rod 54 relative to a core plate 64 and fuel bundles 46. CRD 58 extends through bottom head 12 and is enclosed in a control rod drive housing 66. A control rod guide tube 56 extends vertically from control rod drive mechanism housing 66 to core plate 64. Control rod guide tubes 56 restrict non-vertical motion of control rods 54 during control rod 54 insertion and withdrawal.

Figure 2:
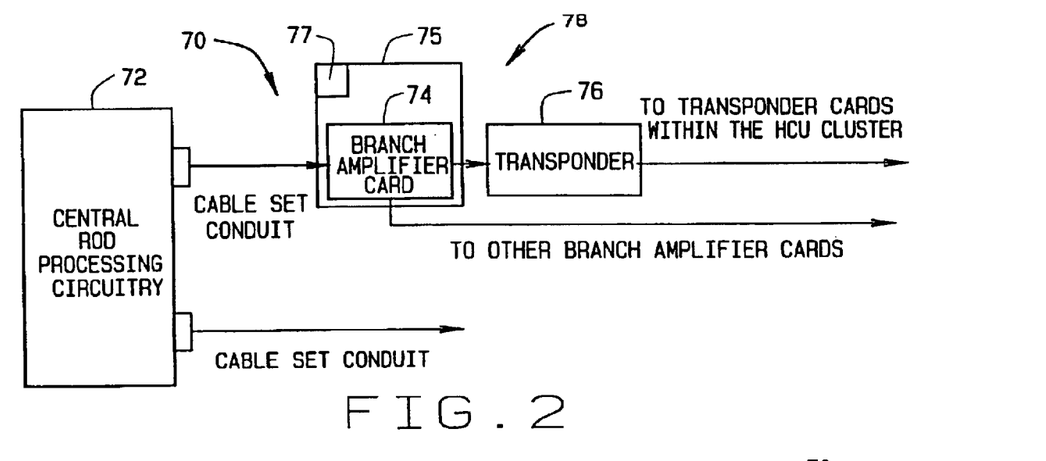
FIG. 2 is a simplified block diagram of the control rod drive control system in accordance with an embodiment of the present invention.

FIG. 2 is a simplified block diagram of a control rod drive control system (RDCS) 70 in accordance with an embodiment of the present invention. RDCS 70 includes central rod processing circuitry or control processor 72 that is operationally coupled to a branch amplifier card 74 that is operationally coupled to a transponder card 76. Particularly, in one embodiment, branch amplifier card 74 and transponder card 76 are operationally coupled to control processor 72 via serial digital electronic communication. Transponder card 76 is part of a hydraulic control unit (HCU) 78. HCU 78 includes a plurality of transponder cards 76 arranged in clusters of several transponder cards 76 coupled to a branch amplifier card 74. Branch amplifier card 74 serves, in part, to distribute command (CMD) words it receives from central rod processing circuitry 72 to transponder cards 76 within its cluster and to the next downstream branch amplifier card 74. In a reverse manner, acknowledge (ACK) words are routed within a cluster to the cluster's branch amplifier card 74. Each branch amplifier card 74, in turn, routes the ACK work to a branch amplifier card 74 further upstream and back to control processor 72.

Each branch amplifier card 74 is mounted in a branch junction module (BJM) 75 that also contains a constant voltage transformer 77, wiring to and from other branch junction modules, and wiring for transponder cards 76 under the control of branch amplifier card 74 contained in branch junction module 75. Constant voltage transformer 77 regulates the voltage to branch amplifier card 74 and transponder cards 76.

Branch amplifier card 74 functions as a router of serial instructions (words) to and from central rod processing circuitry 72 and transponder cards 76, and other branch amplifier cards 74 in an asynchronous multiplexing system. Branch amplifier card 74 decodes serialized instructions contained in an ACKNOWLEDGE (ACK) word containing identification and status data from transponder cards 76 and adds additional information to the ACK word, which is subsequently processed by RDCS 70. Branch junction modules 75 are arranged in clusters with several HCUs 78 connected to a BJM 75. BJM 75 serves in part to distribute the COMMAND (CMD) words it receives from central rod processing circuitry 72 to HCUs 78 within its cluster and to the next BJM 75 downstream. In reverse manner, ACK words are routed within a cluster to the cluster's BJM 75 and each BJM 75, in turn, routes the ACK word to the BJM 75 further upstream and back to central rod processing circuitry 72.

RDCS 70 interrogates branch amplifier card 74 at intervals as part of a self-testing program. Failure of a branch amplifier card 74 to encode a proper ACK word is detected immediately in the control room and indicated through an annunciation window alarm. Through a diagnostic display in RDCS 70, the user is able to determine if the failure is due to a branch amplifier card 74 or a transponder card 76.

Figure 3:
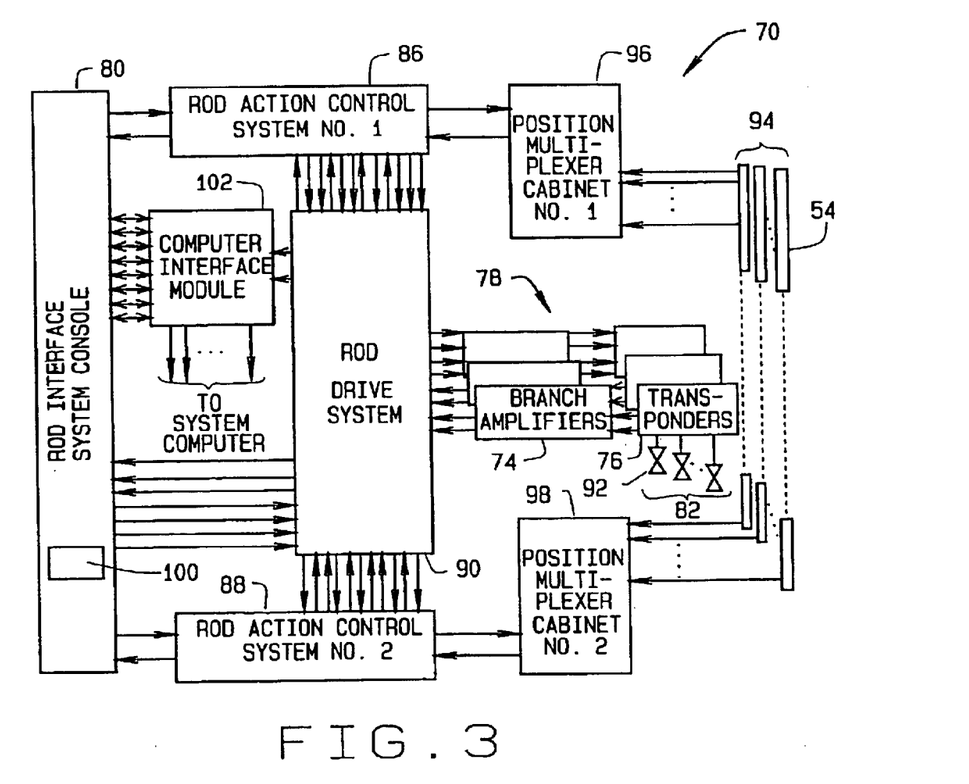
FIG. 3 is a signal flow diagram of the control rod drive system.

With reference to FIG. 3, in an exemplary embodiment, RDCS 70 enables a plant operator to select and maneuver control rods and display rod positions at all times. It includes a set of components, both in the control room and inside the containment, that generate, check and distribute digital electronic messages ("words") sent from an operator's console 80 to hydraulic control units 82 and from rod position probes 94 back to console 80.

A general overview of the operation of the RDCS 70 is as follows. The plant operator selects the rod or rods to move at rod interface system (RIS) bench-board console 80. Request words are sent to two redundant rod action control system (RACS) cabinets 86 and 88. Each RACS cabinet 86 and 88 independently evaluates the operator's request to insure that the desired rod motion will result in a permissible control rod pattern. Validated requests are transmitted to a rod drive system (RDS) cabinet 90. RDS cabinet 90 compares the validated rod movement commands from the two RACS cabinets 86 and 88 and, if they agree, sends CMD words to a set of hydraulic control rod drive units 58 via clusters of branch junction amplifier cards 74 and transponder cards 76. A plurality of position probes 94 underneath pressure vessel 10 measure control rod 54 positions and send probe word messages to two redundant rod position multiplexer (MUX) cabinets 96 and 98. RACS cabinets 86 and 88 independently compare measured rod positions against allowed rod pattern configurations. RACS cabinets 86 and 88 send position information to RDS cabinet 90 for further transmittal to an operator's display 100 on RIS console 80. RDS cabinet 90 sends position data to a plant process computer (not shown) by means of Process words sent via a computer interface module 102.

HCU transponder card 76 is configured to receive and buffer CMD words on to downstream transponder cards 76 in the same cluster. Transponder card 76 is also configured to compare a command address embedded in the CMD word with the transponder card's own unique identification card address. If the addresses compare (agree), then the command bits of the CMD word are decoded and the appropriate directional control valve solenoid 92 is energized. Transponder card 76 is also configured to transmit its own ACK word to the next upstream transponder card 76. If the addresses do not compare, then transponder card 76 passes the signal on the ACK input to the ACK output. Each transponder card 76 also is configured to generate valve activity bits based on its monitoring of HCU directional control valve solenoid circuits for continuity and energization. Further, each transponder card is configured to generate an ACK word composed of an identification card address, directional valve activity bits, HCU status bits, and transponder trouble bits.

Each transponder 76 is configured to receive as input CMD words from the upstream transponder card or a branch amplifier card 74, ACK words from the downstream transponder card, and HCU 78 status. HCU 78 status includes:

Both scram valves not fully closed

Scram accumulator trouble ($N_2$ gas pressure low or water on the gas side of the accumulator piston)

Both scram test switches not in "Normal"

AC voltage from the downstream transponder card

Each transponder card 76 is configured to output CMD words to the downstream transponder and ACK words to the upstream transponder or branch amplifier card. Further, each transponder card 76 is configured to output switched AC voltage to the directional control valve solenoids and AC voltage to the downstream voltage. Any suitable AC voltage can be used, for example, 120 volts AC at 60 Hz or 12 volts AC at 50 Hz. Of course, AC voltages higher or lower than 120 volts AC can be used.

Each branch amplifier card 74 is configured to receive a differential CMD word form an upstream branch amplifier card 74 and resend the CMD word as a differential signal to a downstream branch amplifier card 74. Each branch amplifier card 74 is also configured to receive a differential ACK word from a downstream branch amplifier card 74 and to resend the ACK word as a differential signal to an upstream branch amplifier card 74. Using the differential CMD received from an upstream branch amplifier card 74, the branch amplifier card 74 buffers the signal and sends the CMD word as a single ended signal to the branch of transponder cards 76 under the branch amplifier card's control. Each branch amplifier card 74 is further configured to receive a single ended ACK word from the branch of transponder cards 76 under the direct control of the branch amplifier card 74 and send the ACK word to the upstream branch amplifier card 74 as a differential signal. Further, each branch amplifier card 74 is configured to provide automatic switching of the ACK word such that a defective ACK word from a transponder card 76 does not prevent reception and retransmission of ACK words from downstream branch amplifier cards 74 to upstream branch amplifier cards 74.

Branch amplifier card 74 generates two additional pieces of information in the form of two bits that are attached to the end of the ACK word from transponder cards 76 that are in the branch amplifier card's branch of transponder cards. The two bits of information are not added to ACK words received from downstream branch amplifier cards 74. The two bits of information have been added by the downstream branch amplifier card 74 for transponder cards 76 in the downstream branch amplifier card's branch of transponder cards 76. The first bit, or Pn bit is added to the ACK word to show when the AC voltage is greater than the threshold level of the negative half cycle of the AC waveform. The Pn bit is a logic "0" when the AC voltage is less than the negative threshold level and a logic "1" when the AC voltage is greater than the negative threshold value. The second bit, or Pp bit is added to the ACK word to show when the AC voltage is greater than the voltage threshold for the positive half cycle of the AC waveform. The Pp bit is a logic "0" when the AC voltage is less than the positive threshold level and a logic "1" when the AC voltage is greater than the positive threshold value.

A Pn threshold jumper sets the negative voltage threshold. With the jumper installed, the threshold is −142 volts and with the jumper removed, the threshold is −95 volts. A Pp threshold jumper sets the positive voltage threshold. With the jumper installed, the threshold is +142 volts and with the jumper removed, the threshold is +95 volts.

A configuration jumper determines how branch amplifier card 74 adds the Pn and Pp bits to the ACK word. Without the jumper installed, branch amplifier card 74 separately adds the Pn and the Pp bits in their appropriate location of the ACK word (see FIG. 5). With the jumper installed, branch amplifier card 74 logically "ors" the Pn and Pp bits to form a PnPp bit. The PnPp bit is a logic "1" when the AC voltage is above the threshold values set by the Pn and Pp jumpers, for example, greater than +95 volts and greater than −95 volts (e.g., −96 volts). The PnPp bit occupies the location of the Pn bit when there is no configuration jumper installed. The Pp bit location is then used to pass through the transponder trouble bit Tt that is added to the ACK word by a transponder card 76 as described below (see FIG. 6).

Inputs into branch amplifier card 74 include CMD words from the upstream branch amplifier card 74 located in a branch junction module 75, ACK words from the downstream branch amplifier card 74, 120 VAC from RDCS 70. Outputs from branch amplifier card 74 include CMD words to the downstream branch amplifier card 74, CMD words to the transponder cards under the control of the branch amplifier card 74, and ACK words to the upstream branch amplifier card 74 or BJM 75.

Figure 4:
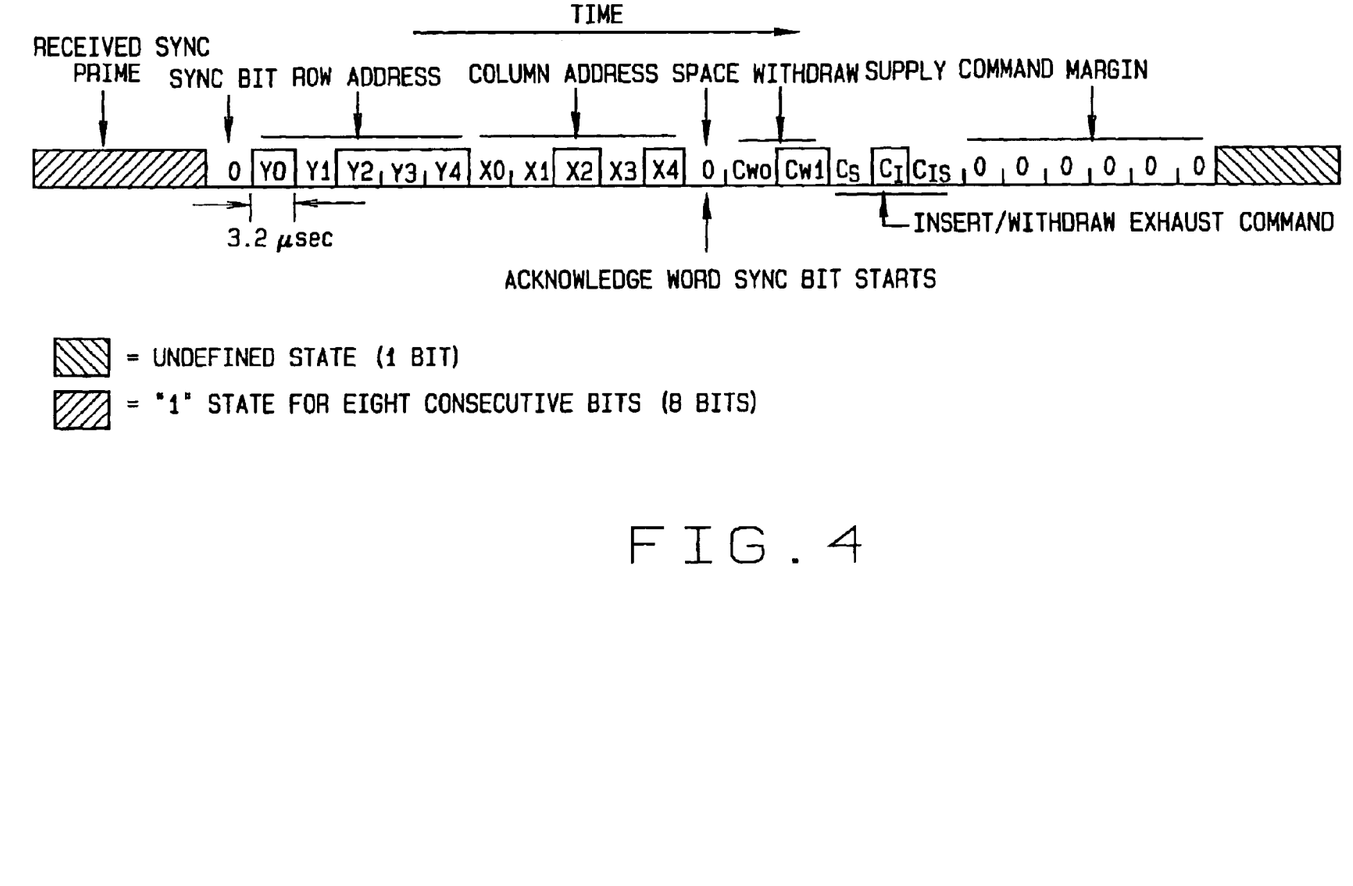
FIG. 4 is a representation of a command word.

The CMD word is composed of a 32-bit serial word transmitted as a serial data stream. This data stream can be divided into 8 defined sections. The data bit transmission rate is 312.5 kHz (3.2 µs), which results in a 102.4 µs of total word length. FIG. 4 shows an exemplary embodiment of a CMD word and Table I provides the description of the CMD word shown in FIG. 4.

TABLE I

|  | NUMBER OF BITS | BIT DESIGNATION | STATE |
| --- | --- | --- | --- |
| Received Sync | 8 | Prime | Eight "1" State |
| CMD Sync Bit | 1 | Sync | One "0" State |
| Row Address | 5 | $Y_0\ Y_1\ Y_2\ Y_3\ Y_4$ | * |
| Column Address | 5 | $X_0\ X_1\ X_2\ X_3\ X_4$ | * |

TABLE I-continued

| | NUMBER OF BITS | BIT DESIGNATION | STATE |
|---|---|---|---|
| Space | 1 | Spacer | One "0" State |
| Withdraw Supply | 2 | $C_{W0}$ $C_{W1}$ | See Table II |
| Insert/Withdraw Supply and Exhaust | 3 | $C_S$ $C_1$ $C_{1S}$ | See Table II |
| Margin | 6 | | Six "0" States |
| Undefined | 1 | | |
| Total | 32 | | |

*Branch amplifier cards are not addressable by a row and column address; however, the transponder cards in each branch amplifier's branch are uniquely indentifiable. Each transponder has its own ID number corresponding to the plant arrangement of HCUs. Each ID number is composed by row and column address corresponding to the X and Y coordinates of the plant arrangement.

The Received Synchronization prime is sent prior to CMD Synchronization bit. The state of prime bits is "1". The CMD Synchronization bit is set at "0" state. When the transponder card receives this bit, it indicates that the row address will be received on the next bit. Each Transponder has its own ID number corresponding to the plant arrangement of HCUs. Each ID number is composed by row and column address corresponding to the X and Y coordinates of the plant arrangement. The Space bit is sent to separate the ID number from command bits. The state of space bit is set at "0". When the ID number matches with a particular transponder, the ACK word is generated at this point. The Withdraw Supply and Insert/Withdraw Exhaust bits of the CMD word are dynamically encoded. When the Transponder receives command bits for HCU directional control valve activation, the succeeding word's command bits are required to be encoded with the complement of previous word's command bits. If the succeeding word's command bits are not encoded as complement of previous command bits, the activated control valve will be timed out (de-energized). Table II shows the logical values of the command bit that cause the activation to occur. The Margin set of bits is set at "0" state, and is sent prior to the received synchronization bits. The purpose of the margin bits is to permit the transponder card to complete the transmission of the ACK word.

TABLE II

| CONTROL ROD ACTION | VALVE ACTION | $C_{1S}$ | $C_1$ | $C_S$ | $C_{W1}$ | $C_{W0}$ |
|---|---|---|---|---|---|---|
| None | None | 1 | 1 | 1 | 1 | 1 |
| | | 1 | 1 | 1 | 1 | 1 |
| Insert | Activate | 1 | 1 | 0 | X | X |
| | Insert Supply & Exhaust | 0 | 0 | 1 | X | X |
| Withdraw | Activate | X | X | X | 1 | 0 |
| | Withdraw Supply | X | X | X | 0 | 1 |
| Withdraw & Settle | Activate | 0 | 1 | 0 | X | X |
| | Withdraw Exhaust | 1 | 0 | 1 | X | X |

Figure 5:
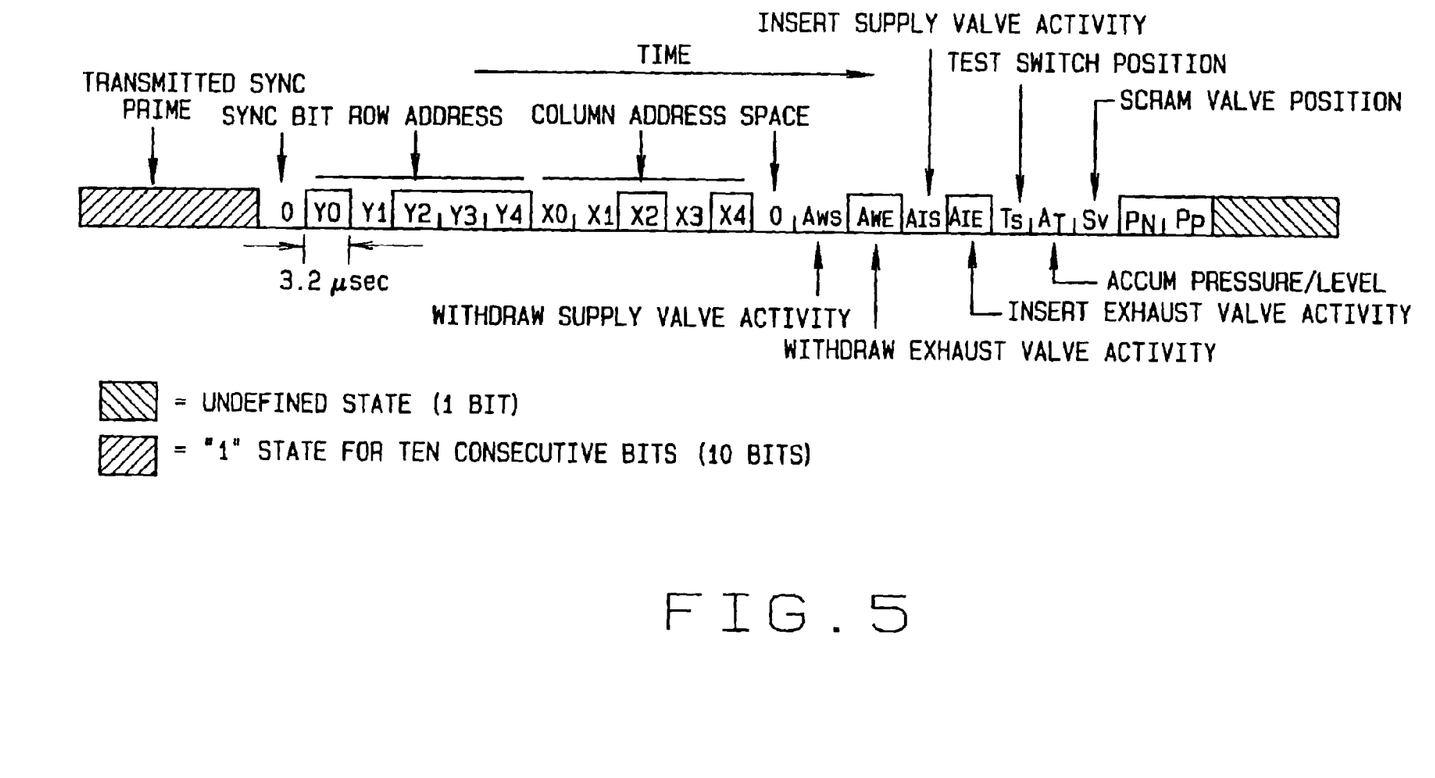
FIG. 5 is a representation of an acknowledge word.

The ACK word is also composed of a 32-bit serial data stream. This data stream can be divided into eight sections. The data transmission rate is 312.5 kHz (3.2 μs), which results in 102.4 μs of total word length. FIG. 5 shows an exemplary embodiment of an ACK word and Table III provides the description of the ACK word shown in FIG. 5.

TABLE III

| | NUMBER OF BITS | BIT DESIGNATION | STATE |
|---|---|---|---|
| Transmitted Sync | 10 | Prime | Ten "1" State |
| ACK Sync Bit | 1 | Sync | One "0" State |
| Row Address | 5 | $Y_0$ $Y_1$ $Y_2$ $Y_3$ $Y_4$ | * |
| Column Address | 5 | $X_0$ $X_1$ $X_2$ $X_3$ $X_4$ | * |
| Space | 1 | Spacer | One "0" State |
| Direction Control Valve Status | | | |
| Withdraw supply valve activity | 1 | $A_{WS}$ | "0" foe Valve Energized |
| Withdraw exhaust valve activity | 1 | $A_{WE}$ | "0" for Valve Energized |
| Insert supply activity | 1 | $A_{1S}$ | "0" for Valve Energized |
| Insert exhaust valve activity | 1 | $A_{1E}$ | "0" for Valve Energized |
| HCU Status | | | |
| Test switch position | 1 | $T_S$ | "1" for Both Closed |
| Accumulator pressure/level | 1 | $A_T$ | "1" for High Pressure and No Leak |
| Scram valve position | 1 | $S_V$ | "0" for Both Open |
| Negative AC Peak Level** | 1 | $P_N$ | "1" when above negative peak threshold |
| Positive AC Peak Level** | 1 | $P_P$ | "1" when above positive peak threshold |
| Undefined | 1 | | |
| Total | 32 | | |

Figure 6:
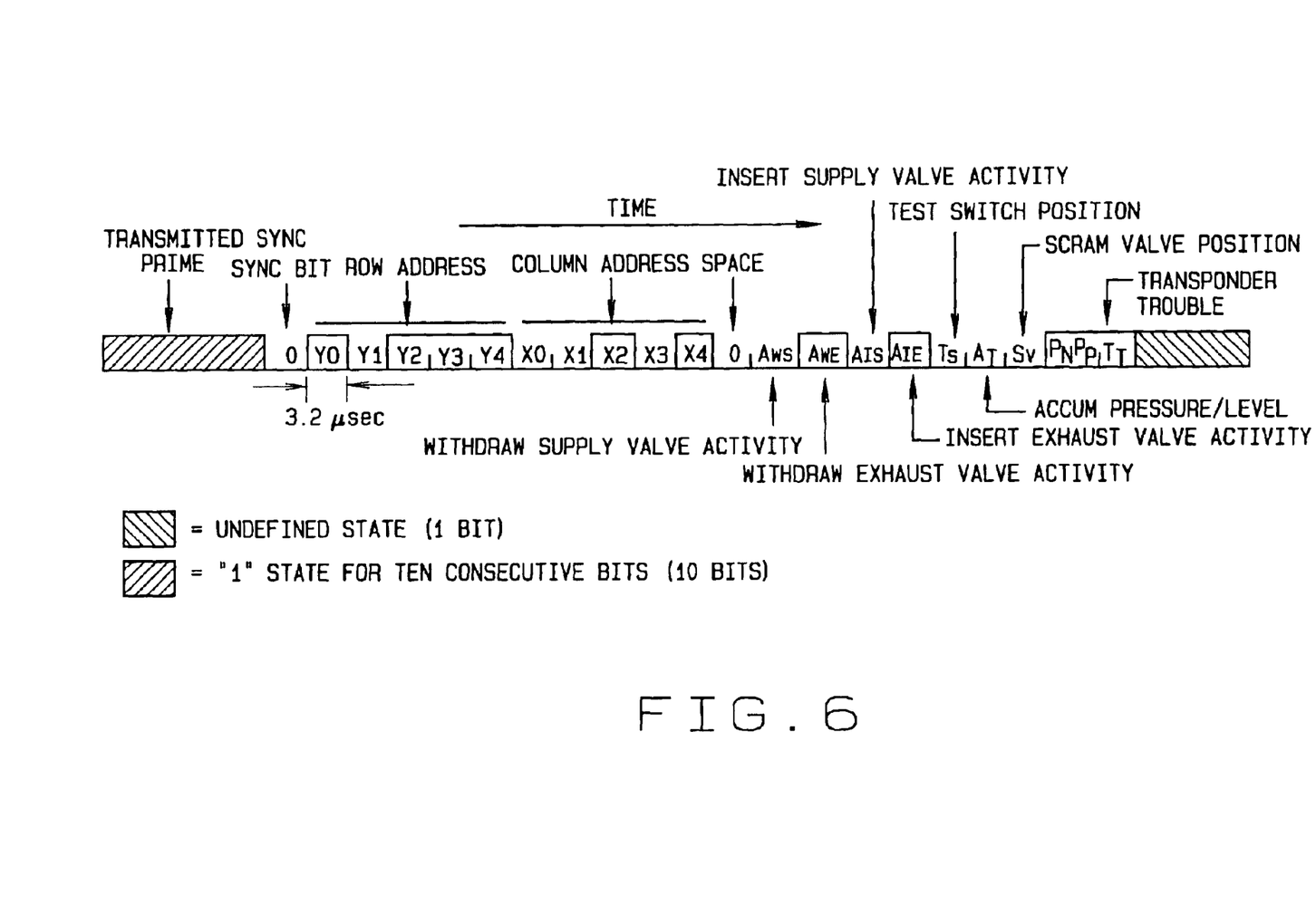
FIG. 6 is an alternate representation of an acknowledge word.

*Branch amplifier cards are not addressable by a row and column address; however, the transponder cards in each branch amplifier's branch are uniquely indentifiable. Each transponder has its own ID number corresponding to the plant arrangement of HCUs. Each ID number is composed by row and column address corresponding to the X and Y coordinates of the plant arrangement.
**When the branch amplifier jumper is installed, the $P_N$ bit becomes the $P_N P_P$ bit and the $P_P$ bit becomes a Transponder Trouble bit ($T_T$) as shown in FIG. 6.

In conjunction with the Synchronization bit, the Transmitted Synchronization Prime Bits serves to provide a means for the receiving circuitry to synchronize its reception to the word being received in order to interpret the bit meanings correctly. Ten consecutive "1" states are required to synchronize the receiving circuitry. The ACK Synchronization bit is set at "0". This bit in conjunction with the Transmitted Synchronization Prime is used to synchronize the receiving circuitry to the word being received. Each Transponder has its own ID number corresponding to the plant arrangement of HCUs. Each ID number is composed by row and column address corresponding to the X and Y coordinates of the plant arrangement. The Space bit is sent to separate the ID number from the Directional Valve Status Bits. The state of space bit is set at "0". The Direction Valve Status Bits contains four bits, and provides the activation status of directional valves. The status of each valve is given by the following two equations.

SET ("1" State)=(Input power is above AC peak) AND (solenoid valve circuitry has continuity) AND (solenoid valve is de-energized)

RESET ("0" State)=(Input power is near 0 volt) OR (solenoid valve circuitry is opened) OR (solenoid valve is energized)

The HCU status contains three bits, and provides the test switch, HCU accumulator pressure and scram valve position. The Transponder removes power to the solenoid and sets the Transponder Trouble flag to "1" if the Transponder detects energization of a directional control solenoid without an appropriate command.

HCU transponder card 76 includes a self-testing function that uses solid-state relays in each of the valve control circuits to interrupt the current through the directional valve solenoids if the self-testing circuitry detects a disagreement between the valve monitoring circuitry and the command word received by the card. In other words, if the valve is energized with no command, the self-test circuitry removes power to the valve solenoid after a short time delay by turning off the solid-state relay that is in series with the valve current path. Once the HCU Transponder self-test circuitry detects an agreement between the CMD word and the valve activity, the solid-state relay will again be energized and allow the transponder to operate properly. An Analyzer Card in central rod processing circuitry 72 interrogates the HCU Transponder at intervals as part of a self-testing program. Failure of a Transponder to encode a proper ACK word is detected immediately in the control room and indicated through an annunciation window alarm. The self-test feature of the HCU Transponder 76 detects and prevents operation of a control rod directional control solenoid without an appropriate command from the Rod Drive Control System. A secondary self-test feature of the HCU Transponder is to detect most single component failure modes that would prevent activation of the back-up solenoid de-energization circuitry.

HCU Transponder 76 removes power to the solenoid and sets the "Transponder Trouble" flag (serial word bit) to a logic "one" if HCU transponder 76 detects energization of a directional control solenoid without an appropriate command. The "Transponder Trouble" flag occupies the bit location reserved for the PN and Pp bits added to the Acknowledge word by branch amplifier card 74. When the branch amplifier jumper is installed, the PN bit becomes the PNPP bit and the Pp bit becomes a Transponder Trouble bit ($T_T$).

If a momentary short turns on the valve control solenoid but is subsequently removed, transponder 76 will remove power to the valve circuit by de-energizing the solid state relay. Every two minutes, the Analyzer Card will retest the failed Transponder Card. Retesting of the valve control solenoid by the Analyzer Card will provide an agreement between the disconnected state of the valve control monitoring circuitry (appears to the valve monitoring circuitry as energized) and the Analyzer "test" Command word. The self-test circuitry in transponder 76 will again energize the solid-state relay and permit the transponder control circuitry to energize the directional valve solenoid upon command. With control returned to the valve energization circuitry, transponder 76 again operates in a normal manner.

Branch amplifier card 74 can accurately monitor the AC threshold voltage levels and select an appropriate voltage threshold. Branch amplifier card 74 can be configured to pass a transponder trouble flag to the central rod processing circuitry.

While the invention has been described in terms of various specific embodiments, those skilled in the art will recognize that the invention can be practiced with modification within the spirit and scope of the claims.

What is claimed is:

1. A branch amplifier card for a nuclear reactor control rod drive control system, the control system comprising a control processor, a plurality of transponder cards arranged in clusters, each cluster under the control of a branch amplifier card, said branch amplifier card configured to:

receive commands from the control processor;

send the converted commands to transponder cards under the control of the branch amplifier card and to a downstream branch amplifier card;

receive an acknowledge word from transponder cards under the control of the branch amplifier card;

add AC voltage threshold level information about the transponder cards under the control of the branch amplifier card to the acknowledge word;

permit transponder trouble information attached to the acknowledge word to remain in the acknowledge word; and resend the acknowledge word including the transponder trouble information to an upstream branch amplifier card.

2. A branch amplifier card in accordance with claim 1 wherein said branch amplifier card is further configured to:

receive a differential command word from an upstream branch amplifier; and resend the command word as a differential signal to a downstream branch amplifier.

3. A branch amplifier card in accordance with claim 1 wherein said branch amplifier card is further configured to:

receive a differential acknowledge word from a downstream branch amplifier card; and resend the acknowledge word as a differential signal to an upstream branch amplifier card.

4. A branch amplifier card in accordance with claim 3 wherein said branch amplifier card is further configured to:

buffer the command word differential signal; and send the command word as a single ended signal to the transponder cards under the control of the branch amplifier card.

5. A branch amplifier card in accordance with claim 1 wherein said branch amplifier card is further configured to:

receive a single ended signal acknowledge word from the transponder cards under the control of the branch amplifier card;

convert the single ended signal acknowledge word to a differential signal acknowledge word; and send the differential signal acknowledge word to an upstream branch amplifier card.

6. A branch amplifier card in accordance with claim 1 wherein said branch amplifier card is further configured to provide automatic switching of an acknowledge word such that a defective acknowledge word from a transponder card does not prevent the reception and retransmission of acknowledge words from downstream branch amplifier cards to upstream branch amplifier cards.

7. A nuclear reactor control rod drive control system, the nuclear reactor including a plurality of control rods, said control system comprising:

a control processor;

a plurality of control rod drives, each said control rod drive configured to connect to a control rod;

an hydraulic control unit connected to each said control rod drive, said hydraulic control unit comprising a transponder card; and a plurality of branch amplifier cards operationally connected to said control processor and to each other, each said branch amplifier operationally connected to and controlling a cluster of transponder cards, said branch amplifier card configured to:

receive commands from said control processor;

send the converted commands to transponder cards under the control of said branch amplifier card and to a downstream branch amplifier card;

receive an acknowledge word from transponder cards under the control of said branch amplifier card;

add AC voltage threshold level information about said transponder cards under the control of said branch amplifier card to the acknowledge word;

permit transponder trouble information attached to the acknowledge word to remain in the acknowledge word; and resend the acknowledge word including the transponder trouble information to an upstream branch amplifier card.

8. A control system in accordance with claim 7 wherein said branch amplifier card is further configured to:

receive a differential command word from an upstream branch amplifier; and resend the command word as a differential signal to a downstream branch amplifier.

9. A control system in accordance with claim 7 wherein said branch amplifier card is further configured to:

receive a differential acknowledge word from a downstream branch amplifier card; and resend the acknowledge word as a differential signal to an upstream branch amplifier card.

10. A control system in accordance with claim 9 wherein said branch amplifier card is further configured to:

buffer the command word differential signal; and send the command word as a single ended signal to said transponder cards under the control of said branch amplifier card.

11. A control system in accordance with claim 7 wherein said branch amplifier card is further configured to:

receive a single ended signal acknowledge word from said transponder cards under the control of said branch amplifier card;

convert the single ended signal acknowledge word to a differential signal acknowledge word; and send the differential signal acknowledge word to an upstream branch amplifier card.

12. A control system in accordance with claim 7 wherein said branch amplifier card is further configured to provide automatic switching of an acknowledge word such that a defective acknowledge word from a transponder card does not prevent the reception and retransmission of acknowledge words from downstream branch amplifier cards to upstream branch amplifier cards.

13. A nuclear reactor comprising:

a reactor pressure vessel;

a reactor core located inside said reactor pressure vessel, said core comprising a plurality of fuel assemblies and a plurality of control rods; and control rod drive control system comprising:

a control processor;

a plurality of control rod drives, each said control rod drive connected to a control rod;

an hydraulic control unit connected to each said control rod drive, said hydraulic control unit comprising a transponder card; and a plurality of branch amplifier cards operationally connected to said control processor and to each other, each said branch amplifier operationally connected to and controlling a cluster of transponder cards, said branch amplifier card configured to:

receive commands from said control processor;

send the converted commands to transponder cards under the control of said branch amplifier card and to a downstream branch amplifier card;

receive an acknowledge word from transponder cards under the control of said branch amplifier card;

add AC voltage threshold level information about said transponder cards under the control of said branch amplifier card to the acknowledge word;

permit transponder trouble information attached to the acknowledge word to remain in the acknowledge word; and resend the acknowledge word including the transponder trouble information to an upstream branch amplifier card.

14. A nuclear reactor in accordance with claim 13 wherein said branch amplifier card is further configured to:

receive a differential command word from an upstream branch amplifier; and resend the command word as a differential signal to a downstream branch amplifier.

15. A nuclear reactor in accordance with claim 13 wherein said branch amplifier card is further configured to:

receive a differential acknowledge word from a downstream branch amplifier card; and resend the acknowledge word as a differential signal to an upstream branch amplifier card.

16. A nuclear reactor in accordance with claim 15 wherein said branch amplifier card is further configured to:

buffer the command word differential signal; and send the command word as a single ended signal to said transponder cards under the control of said branch amplifier card.

17. A nuclear reactor in accordance with claim 13 wherein said branch amplifier card is further configured to:

receive a single ended signal acknowledge word from said transponder cards under the control of said branch amplifier card;

convert the single ended signal acknowledge word to a differential signal acknowledge word; and send the differential signal acknowledge word to an upstream branch amplifier card.

18. A nuclear reactor in accordance with claim 13 wherein said branch amplifier card is further configured to provide automatic switching of an acknowledge word such that a defective acknowledge word from a transponder card does not prevent the reception and retransmission of acknowledge words from downstream branch amplifier cards to upstream branch amplifier cards.

* * * * *